US009869100B2

(12) United States Patent
Sennik (10) Patent No.: US 9,869,100 B2
(45) Date of Patent: Jan. 16, 2018

(54) UNDERLAYMENT FOR A FLOOR (71) Applicant: DMX Plastics Limited, Brampton (CA)

(72) Inventor: Sundeepan Sennik, Thornhill (CA)

(73) Assignee: DMX PLASTICS LIMITED, Brampton (CA)

(*) Notice: Subject to any disclaimer, the term of this patent is extended or adjusted under 35 U.S.C. 154(b) by 0 days.

(21) Appl. No.: 15/346,008

(22) Filed: Nov. 8, 2016

(65) Prior Publication Data
US 2017/0114551 A1 Apr. 27, 2017

Related U.S. Application Data (63) Continuation of application No. PCT/CA2015/050390, filed on May 5, 2015.

(60) Provisional application No. 61/990,243, filed on May 8, 2014.

(51) Int. Cl.
E04B 1/00 (2006.01)
E04G 21/00 (2006.01)
E04G 23/00 (2006.01)
E04F 15/18 (2006.01)
B32B 3/30 (2006.01)
B32B 5/18 (2006.01)
E04F 15/22 (2006.01)
E04F 15/20 (2006.01)

(52) U.S. Cl.
CPC .............. *E04F 15/185* (2013.01); *B32B 3/30* (2013.01); *B32B 5/18* (2013.01); *E04F 15/186* (2013.01); *E04F 15/203* (2013.01); *E04F 15/22* (2013.01); *B32B 2305/022* (2013.01); *B32B 2307/304* (2013.01); *B32B 2419/00* (2013.01)

(58) Field of Classification Search
CPC ....... E04F 15/185; E04F 15/186; E04F 15/22; B32B 3/30; B32B 5/18
See application file for complete search history.

(56) References Cited

U.S. PATENT DOCUMENTS

| 2,192,516 | A | * | 3/1940 | Cunnington | E04B 1/86 181/290 |
| 3,388,516 | A | * | 6/1968 | Thielen | E04F 15/18 52/393 |
| 4,769,271 | A | | 9/1988 | Sekimoto | |
| 5,082,712 | A | | 1/1992 | Starp | |
| 5,518,802 | A | * | 5/1996 | Colvin | B32B 3/12 428/166 |
| 6,286,279 | B1 | * | 9/2001 | Bean | E04F 15/02 52/390 |
| 2003/0172600 | A1 | * | 9/2003 | Choi | B32B 5/32 52/144 |
| 2006/0201092 | A1 | | 9/2006 | Saathoff et al. | |

(Continued)

FOREIGN PATENT DOCUMENTS

CA 2546884 11/2006
WO 2013083880 6/2013

Primary Examiner — Brian D Mattei
(74) Attorney, Agent, or Firm — Bereskin & Parr LLP/ S.E.N.C.R.L., S.R.L.

(57) ABSTRACT

An underlayment for a floor includes a dimpled substrate having a generally planar top side, an opposed bottom side, and a plurality of dimples formed therein. Each dimple is bounded by a dimple wall, and includes a dimple opening along the top side. A smoothing layer is bonded beneficial to the top side of the dimpled substrate and overlays and occludes the dimple openings.

17 Claims, 6 Drawing Sheets (56) References Cited

U.S. PATENT DOCUMENTS

| | | | |
|---|---|---|---|
| 2007/0039268 A1* | 2/2007 | Ambrose, Jr. | B32B 5/02 52/403.1 |
| 2011/0232217 A1 | 9/2011 | Hartl | |
| 2013/0143005 A1 | 6/2013 | Sennik | |
| 2014/0311074 A1* | 10/2014 | Cormier | E04F 15/225 52/403.1 |
| 2014/0311075 A1* | 10/2014 | Cormier | E04F 15/225 52/403.1 |

* cited by examiner

UNDERLAYMENT FOR A FLOOR

This application is a continuation of International Application Serial No. PCT/CA2015/050390, filed May 5, 2015, which claims the benefit of Provisional Application Ser. No. 61/990,243, filed May 8, 2014, each of which is hereby incorporated herein by reference.

FIELD

The disclosure relates to underlayments for a floor. More specifically, the disclosure relates to underlayments that may be used, for example, to space finished flooring such as carpet or vinyl flooring above a cement floor in a basement.

BACKGROUND

U.S. Patent Application Publication No. 2013/0143005 (Sennik) purports to disclose a reinforced protective membrane comprising a water-resistant sheet and a reinforcing netting joined to the water-resistant sheet. The netting may be at least partially embedded in the water-resistant sheet. The reinforced protective membrane may also have a plurality of dimples formed therein. Each dimple may have a recess bounded by a dimple wall, and each dimple may have a dimple opening along a planar side of the water-resistant sheet that leads to the recess. The reinforcing netting may be joined to the water-resistant sheet such that the dimple opening is free from obstruction by the reinforcing netting.

U.S. Patent Application Publication No. 2006/0201092 (Saathoff et al.) purports to disclose a carrier tile consisting of film-like plastic for a floor, wall or ceiling structure, in particular a tile-clad wall or floor structure. The film-like tile has a multiplicity of chambers which are formed by depressions out of a plane of the carrier tile. The outer end faces of the depressions form the first tile side. The depressions are designed for receiving a curing contact means, such as mortar or adhesive, for forming a contact layer with the surface cladding to be applied, and with a net-like fabric or nonwoven arranged on the first tile side. The chambers between the first and an opposite tile side have an undercut-free wall portion. A net-like fabric overlapping the depressions is provided on the opposite tile side.

SUMMARY

The following summary is intended to introduce the reader to various aspects of the disclosure, but not to define any invention.

According to one aspect of the specification, an underlayment for a floor is disclosed. The underlayment comprises a dimpled substrate having a generally planar top side, an opposed bottom side, and a plurality of dimples formed therein. Each dimple is bounded by a dimple wall, and comprises a dimple opening along the top side. A smoothing layer is bonded to the top side of the dimpled substrate and overlays and occludes the dimple openings.

The smoothing layer may comprise a foam sheet. The foam sheet may be antimicrobial. The foam sheet may be one of a cross-linked high density polyethylene foam, a polyurethane foam, or a cross-linked polypropylene foam.

The dimples may have an interior base surface, and an interior height between the top side and the base surface. The interior height may be between about 1 mm and about 5 mm. The interior height may be about 2 mm.

The smoothing layer may be depressible into the dimples by at most 5 mm. The smoothing layer may be depressible into the dimples by about 2 mm.

The dimples may have an interior base surface, and the smoothing layer may be depressible into the dimples to contact the base surface.

The smoothing layer may comprise a puncture resistant fabric.

The puncture resistant fabric may be of a non-woven material. The puncture resistant fabric may be formed from a plastic. The puncture resistant fabric may be formed from one of spun-bond polypropylene, polyethylene terepthlalate, and nylon.

The puncture resistant fabric may be of a woven material.

The puncture resistant fabric may have a puncture strength of at least 18 lbs.

The dimpled substrate may include a first layer bonded to the smoothing layer, and a second layer bonded to the first layer. The first layer may be a plastic structural layer, and the second layer may be a foam layer.

The underlayment may be rollable into a roll.

According to another aspect of the specification, a roll of flooring underlayment is disclosed. The roll of flooring underlayment comprises a dimpled substrate having a structural plastic layer bonded to a foam layer. The dimpled substrate has a top side formed by the plastic layer, an opposed bottom side formed by the foam layer, and a plurality of dimples formed therein. Each dimple is bounded by a dimple wall, and comprises a dimple opening along the top side. A smoothing layer is bonded to the top side of the dimpled substrate and overlays the dimple openings.

The smoothing layer may occlude the dimple openings.

The smoothing layer may comprise a foam sheet. The foam sheet may be antimicrobial. The foam sheet may be one of a cross-linked high density polyethylene foam, a polyurethane foam, or a cross-linked polypropylene foam.

The dimples may have an interior base surface, and an interior height between the top side and the base surface. The interior height may be between about 1 mm and about 5 mm. The interior height may be about 2 mm.

The smoothing layer may be depressible into the dimples by at most 5 mm. The smoothing layer may be depressible into the dimples by about 2 mm.

The dimples may have an interior base surface, and the smoothing layer may be depressible into the dimples to contact the base surface.

The smoothing layer may comprise a puncture resistant material. The puncture resistant material may be a fabric. The puncture resistant material may be formed from a plastic. The puncture resistant material may be of a non-woven material. The puncture resistant material may be formed from one of spun-bond polypropylene, polyethylene terephthalate, and nylon.

The puncture resistant material may be of a woven material.

The puncture resistant layer may have a puncture strength of at least 18 lbs.

According to another aspect of the specification, a method of installing a floor on a base surface is disclosed. The method comprises a) unrolling a roll of flooring underlayment. The flooring underlayment may comprise a dimpled substrate and a smoothing layer bonded to the dimpled substrate. The method further comprises b) applying the dimpled substrate of the flooring underlayment to the base surface, and c) applying a finished floor product directly to the smoothing layer.

Step c) may comprise applying at least one of a laminate flooring product, a vinyl flooring product, and a carpet product to the smoothing layer.

According to another aspect of the specification, an underlayment for a floor is disclosed. The underlayment comprises a dimpled substrate comprising a generally planar top side, an opposed bottom side, and a plurality of dimples formed therein. Each dimple is bounded by a dimple wall, and comprises a dimple opening along the top side. A fabric puncture resistant layer is bonded to the top side of the dimpled substrate and overlays the dimple openings.

In some examples, the fabric puncture resistant layer may occlude the dimple openings.

In some examples, the fabric puncture resistant layer may be formed from a plastic.

In some examples, the fabric puncture resistant layer may be of a non-woven material. For example, the fabric puncture resistant layer may be spun-bond polypropylene. In other examples, the fabric puncture resistant layer may be of a woven material.

In some examples, the dimpled substrate may include a first layer bonded to the fabric puncture resistant layer, and a second layer bonded to the first layer. The first layer may be a plastic structural layer, and the second layer may be a foam layer.

In some examples, the fabric puncture resistant layer may have a puncture strength of at least 18 lbs.

In some examples, the underlayment may be rollable in to a roll.

According to another aspect of the specification, a roll of flooring underlayment is disclosed. The roll of flooring underlayment comprises a dimpled substrate comprising a structural plastic layer bonded to a foam layer. The dimpled substrate has a top side formed by the plastic layer, an opposed bottom side formed by the foam layer, and a plurality of dimples formed therein. Each dimple is bounded by a dimple wall, and comprises a dimple opening along the top side. A puncture resistant layer is bonded to the top side of the dimpled substrate and overlays the dimple openings.

In some examples, the puncture resistant layer may occlude the dimple openings.

In some examples, the puncture resistant layer may be formed from a plastic.

In some examples, the puncture resistant layer may be a fabric. The puncture resistant layer may be of a non-woven material, for example spun-bond polypropylene. In other examples, the puncture resistant layer may be of a woven material.

In some examples, the puncture resistant layer may have a puncture strength of at least 18 lbs.

According to another aspect of the specification, a method of installing a floor on a base surface is disclosed. The method comprises unrolling a roll of flooring underlayment. The flooring underlayment may comprise a dimpled substrate and a puncture resistant layer bonded to the dimpled substrate. The method further comprises applying the dimpled substrate of the flooring underlayment to the base surface, and applying a finished floor product directly to the puncture resistant layer.

In some examples, the method may comprise applying at least one of a laminate flooring product, a vinyl flooring product, and a carpet product to the puncture resistant layer.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any invention disclosed in an apparatus or process described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

Figure 1:
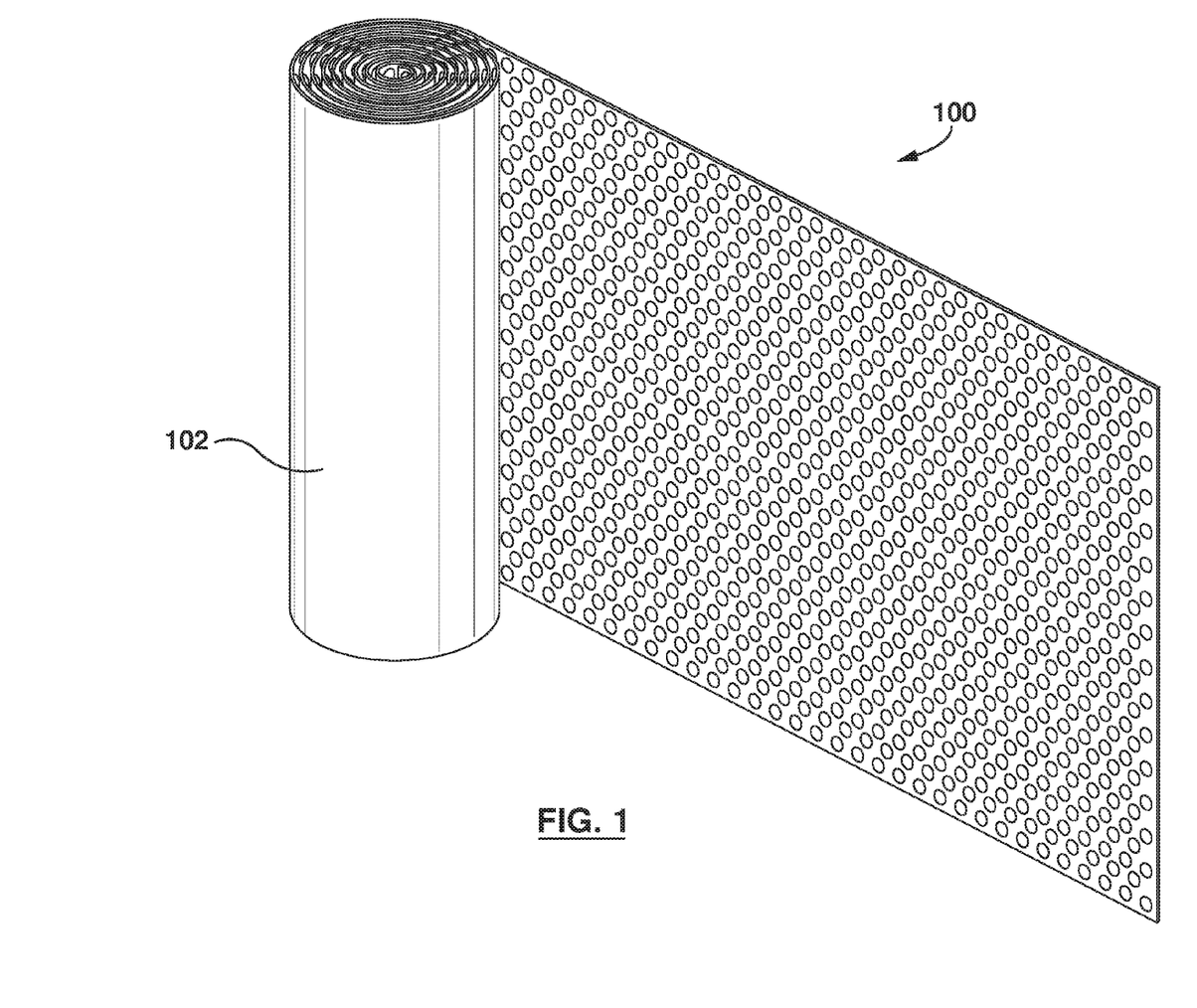
FIG. 1 is a perspective view of a roll of underlayment.

Referring to FIG. 1, an example flooring underlayment 100 is shown. The underlayment 100 is shown in a rolled configuration forming a roll 102, which may be unrolled for installation. In other examples, the underlayment 100 may be in another configuration, such as a tile.

Figure 2:
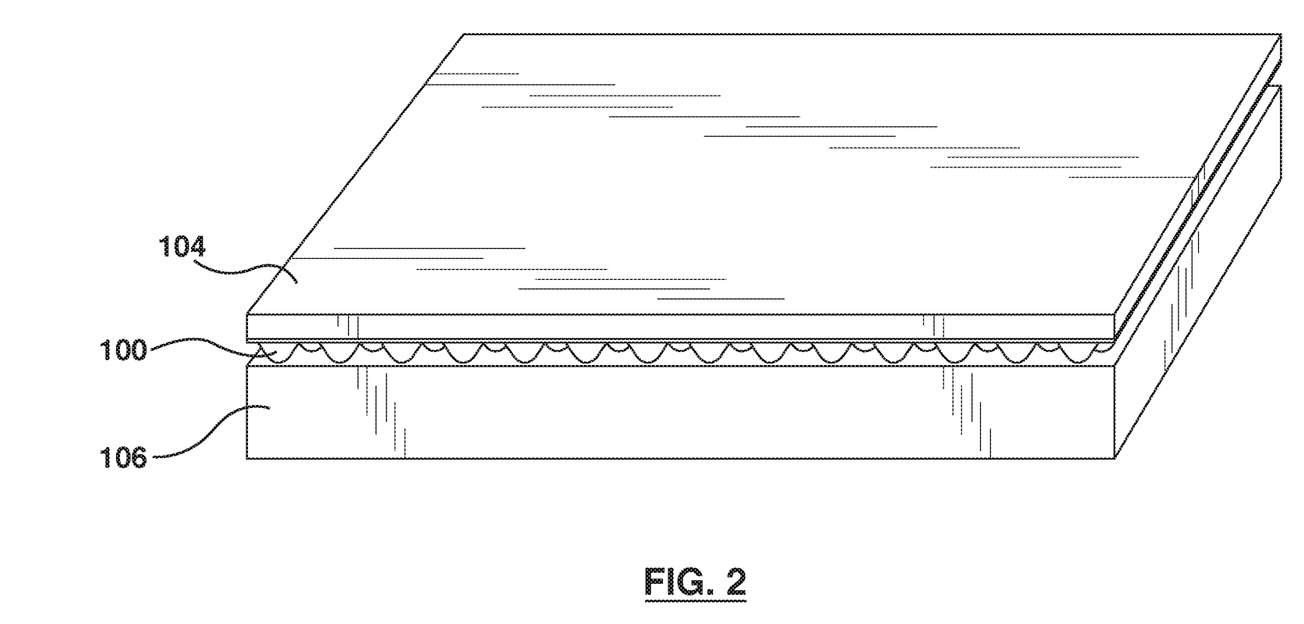
FIG. 2 is a perspective view showing the underlayment of FIG. 1 unrolled and applied to a cement floor, with a finished flooring product applied to the underlayment.

Referring to FIG. 2, the underlayment 100 may be installed, for example, in a basement, and may be used to space a finished flooring product 104 from a base surface, such as a cement or concrete floor 106 of the basement. The finished flooring product 104 may be, but is not limited to, vinyl flooring, laminate flooring, carpet (alone or with an underpad), solid hardwood, engineered hardwood, and tile. Spacing the finished flooring product 104 from the base surface may protect the finished flooring product 104 from water, and allow for drainage of the water. Furthermore, as will be described below, in some examples the underlayment 100 may protect the finished flooring product 104 from microbial growth, provide thermal insulation, and provide sound insulation. In some particular examples, the finished flooring product 104 may be installed directly over the underlayment 100, without the use of an additional subfloor (such as oriented strand board (OSB) subflooring or plywood) between the underlayment 100 and the finished flooring product 104. This may allow for ease of installation of the flooring, decrease the total height of the flooring, and decrease the cost of the flooring.

Figure 3:
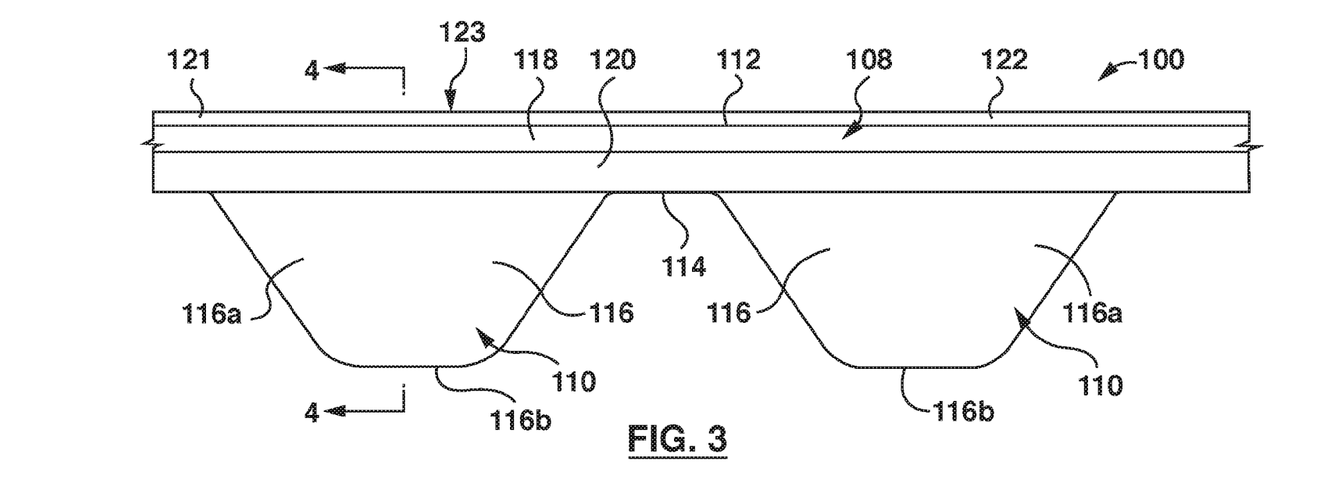
FIG. 3 is an enlarged side view of the underlayment of FIG. 1.
Figure 4:
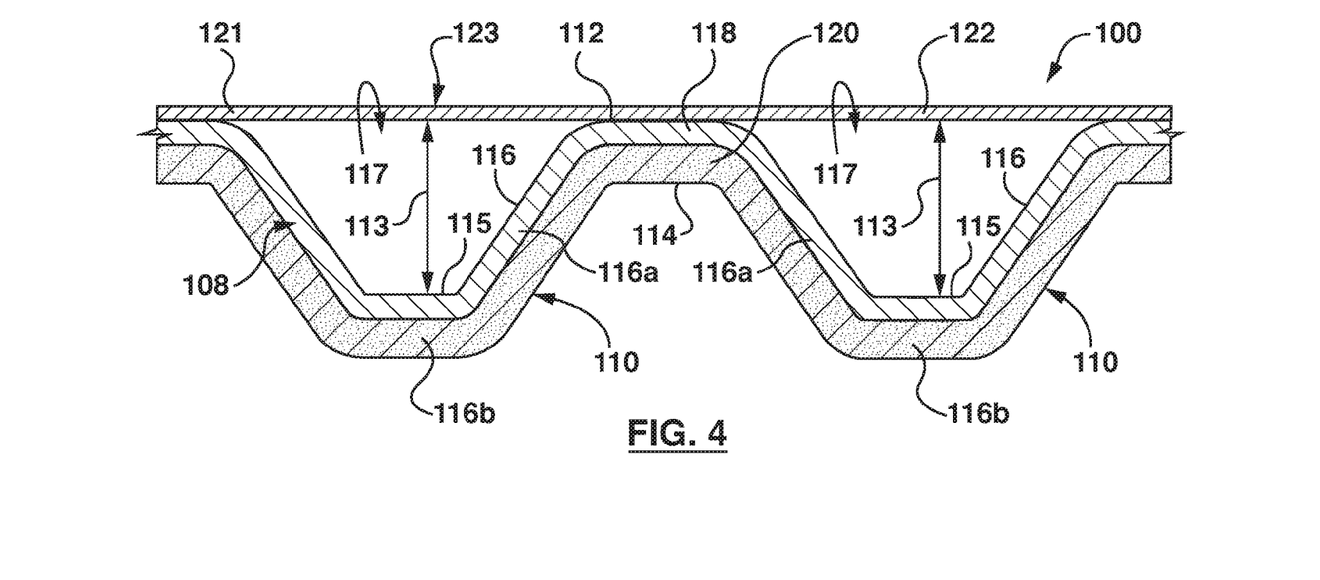
FIG. 4 is a cross-sectional view taken along line 4-4 in FIG. 3.

Referring now to FIGS. 3 and 4, the underlayment 100 includes a substrate 108 (also referred to as a dimpled substrate 108), which has a plurality of dimples 110 formed therein. The dimples 110 can help to space the flooring product 104 from the cement or concrete floor 106, while allowing for drainage between the dimples 110.

Referring still to FIGS. 3 and 4, in the example shown, the substrate 108 has a generally planar top side 112, and an opposed bottom side 114. The dimples 110 are each bounded by a dimple wall 116, and include a dimple opening 117 along the top side 112. In the example shown, the dimples 110 are generally frustoconcial, and the dimple wall 116 includes a sidewall 116*a* and a bottom wall 116*b*. The dimples also have an interior base surface 115. In other examples, the dimples may be of another shape, such as cubic or frustopyramidal.

The dimples may have an interior height 113 between the top side 112 and the interior base surface 115. In some examples, the interior height may be between about 1 mm and about 10 mm. In the example shown, the interior height is between about 6 mm and about 10 mm. More specifically, in the example shown, the interior height is about 7 mm.

Referring still to FIGS. 3 and 4, in the example shown, the dimpled substrate 108 includes two layers: a first layer 118, an upper surface of which forms the top side of the dimpled substrate 108, and a second layer 120, a bottom surface of which the bottom side 114 of the dimpled substrate 108. The first layer 118 may be a structural layer (i.e. may provide structural strength and in particular compression resistance to the underlayment 100), and may be made from a material such as high density polyethylene, polyethylene, polypropylene, and/or other plastics. The second layer 120 may be a foam layer. For example, the second layer 120 may be a cross-linked high density polyethylene foam, polyurethane, or a cross-linked polypropylene foam. In some particular examples, the foam may be antimicrobial, in order to protect the finished flooring product 104 from mould and/or other microbial growth. The foam may additionally serve to provide sound insulation and thermal insulation.

In alternate examples, the underlayment may include only a single layer, for example a single layer of dimpled structural plastic, or may include more than two layers.

Figure 4B:
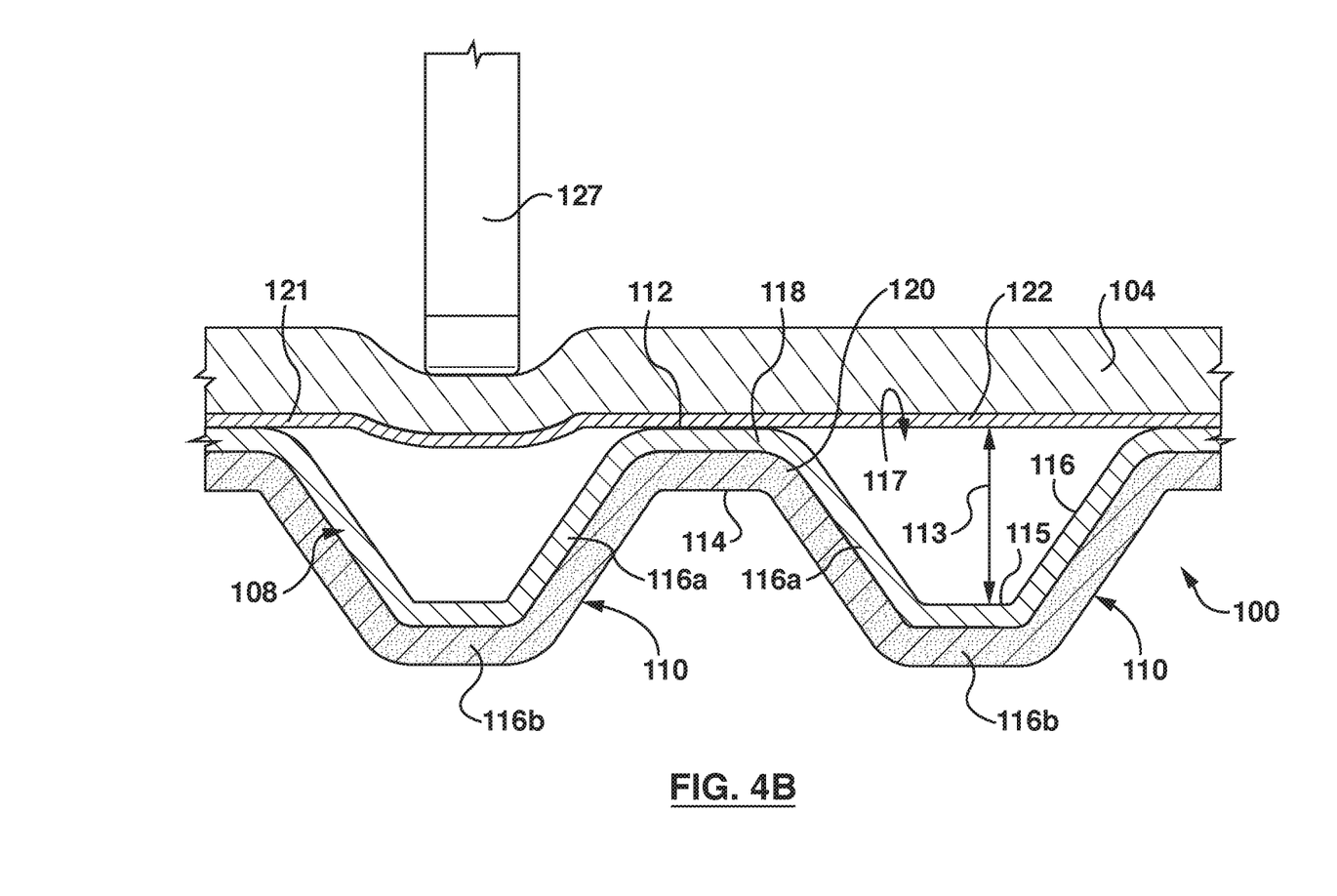
FIG. 4B is a cross-sectional view similar to that of FIG. 4, but also showing a finished flooring product installed on the underlayment, and a high-heeled shoe in use on the finished flooring product.

Referring still to FIGS. 3 and 4, a smoothing layer 121 is bonded to the top side 112 of the dimpled substrate 108, and overlays the dimple openings 117. The smoothing layer 121 provides the underlayment with a smoothed top surface 123, so that when a user is walking on the finished flooring product 104, the dimples are generally not perceptible to the user, or are minimally perceptible to a user. For example, in use, when the underlayment 100 is installed (e.g. applied to the base surface of a basement), the finished flooring product 104 may be installed above the underlayment 100. For example, the finished flooring product 104 may be applied directly to the smoothing layer 121, without the use of a subfloor between the underlayment 100 and the finished flooring product 104. In instances where the finished flooring product 104 is generally soft (e.g. carpet, carpet with underpad, or vinyl flooring), the smoothing layer 121 may prevent objects from pressing the finished flooring product 104 downwardly into the dimples 110 by a perceptible amount, and may prevent objects from potentially puncturing through the finished flooring product 104 and into the dimples 110. For example, referring to FIG. 4B, if a finished flooring product 104 such as carpet (alone or in combination with an underpad) or vinyl flooring is applied directly to the smoothing layer 121, and is walked on with high-heeled shoes (such as stiletto heeled shoes) 127, the smoothing layer 121 may prevent the high-heeled shoes from puncturing the carpet or vinyl flooring and protruding into the dimples 110, or from pressing the carpet or vinyl flooring downwardly into the dimples 110 by a perceptible amount.

In the example shown in FIGS. 3 and 4, the smoothing layer 121 is a puncture resistant layer 122 that is bonded to the top side 112 of the dimpled substrate 108, and overlays the dimple openings 117. The puncture resistant layer 122 may be made from any suitable material that, when installed together with a finished flooring product 104 and subjected to typical everyday use of the finished flooring product 104, prevents objects from puncturing through the finished flooring product 104 and into the dimples 110, or from pressing the finished flooring product 104 downwardly into the dimples 110 by a perceptible amount. Some suitable materials may have a puncture strength of at least 18 lbs. (as measured by ASTM 6241), more specifically at least 30 lbs. In some such examples, in typical use, the smoothing layer 121 may be depressible into the dimples by no more than about 5 mm. For example, the smoothing layer 121 may be depressible into the dimples by about 2 mm.

In some examples, the puncture resistant layer 122 may be a fabric. As used herein, the term "fabric" refers to a material that is made from fibers which are either woven or non-woven. In some examples, the use of a fabric for the puncture resistant layer 122 may be advantageous because fabrics may be flexible enough to allow for the underlayment 100 to be rolled into a roll 102, as shown in FIG. 1, for storage and shipping.

In some examples, the fabric puncture resistant layer 122 may generally occlude the dimples 110, so that solids matter may generally not enter the dimples 110. For example, the fabric may be porous and have an apparent opening size of less than 1 mm (as measured by ASTM D-4751). In some particular examples, the apparent opening size may be less than 0.6 mm.

In some examples, the fabric puncture resistant layer 122 may be formed from a plastic. For example, the fabric puncture resistant layer 122 may be a non-woven material such as spun-bond polypropylene (PP), spun-bond polyethylene terephthalate (PET), or spun-bond Nylon such as Nylon 6 or Nylon 6-6. For further example, the puncture resistant layer 122 may be a woven material such as woven polypropylene (PP), woven polyethylene terephthalate (PET), or woven Nylon such as Nylon 6 or Nylon 6-6.

In some particular examples in which the fabric puncture resistant layer 122 is a spun-bond material, the puncture resistant layer 122 may have a puncture strength of at least 18 lbs., more particularly at least 30 lbs., and more particularly between 38 and 43 lbs. (as measured by ASTM 4833).

In one particular example, the puncture resistant layer 122 may be a geotextile such as spun-bond polypropylene sold by US Fabrics Inc. (Ohio, USA) under the name US SF40 SpunBond Nonwoven Geotextile. This material has a puncture strength of 41 lbs. (as measured by ASTM 4833), and an apparent opening size of 0.25 mm (as measured by ASTM D-4751). Experiments have shown that in typical everyday use (i.e. when the underlayment is installed with a finished flooring product, and the finished flooring product is subjected to everyday use), this material is suitable for preventing objects from entering the dimples 110 through the dimple openings 117, for example by pressing the finished flooring product 104 downwardly into the dimples 110 by a perceptible amount, or by puncturing through the finished flooring product 104 and into the dimples 110. Particularly, in one example, an underlayment 100 with US SF40 Spun Bond Nonwoven Geotextile as the puncture resistant layer 122 was installed, and a finished flooring product including a carpet with an underpad was applied directly to the puncture resistant layer 122. The installation was then tested for suitability for typical uses by being walked on with high heeled shoes. It was found that the high heeled shoes did not press material into the dimples 110 by a perceptible amount, nor did the heels puncture through the carpet and into the dimples 110.

In some examples, the underlayment 100 may be manufactured by bonding the puncture resistant layer 122 to the dimpled substrate 108, for example with an adhesive. For example, the structural plastic layer 118 may be vacuum formed to include dimples, and then the foam layer 120 and the puncture resistant layer 122 may be bonded to the structural plastic layer 118 with an adhesive.

In some examples, in order to install the underlayment 100, the underlayment 100 may be unrolled and laid down on a surface, such as a cement or concrete floor 106. The underlayment 100 may be cut, for example with a utility knife, so that it fits the cement or concrete floor 106. As many pieces of cut underlayment 100 as necessary may be applied to cover the cement or concrete floor 106. The pieces of underlayment 100 may then be secured together, for example with acrylic tape. A finished flooring product 104, for example a carpet (alone or with an underpad) may then be applied to the underlayment 100, by laying the finished flooring product 104 over the underlayment 100. In some examples, in order to secure finished flooring product 104 in place, a nail strip may be laid about the perimeter of the cement or concrete floor 106, and the finished flooring product 104 may be nailed to the nail strip.

In alternate examples, a subfloor (such as an OSB subfloor or plywood) may optionally be installed between the underlayment 100 and the finished flooring product 104.

Figure 5:
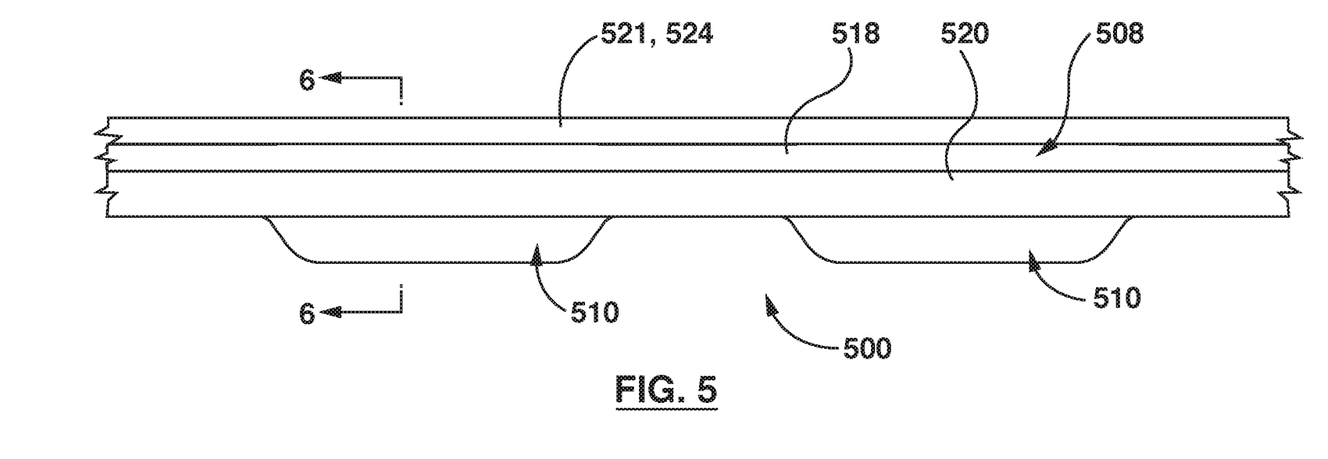
FIG. 5 is an enlarged side view of an alternative underlayment.
Figure 6:
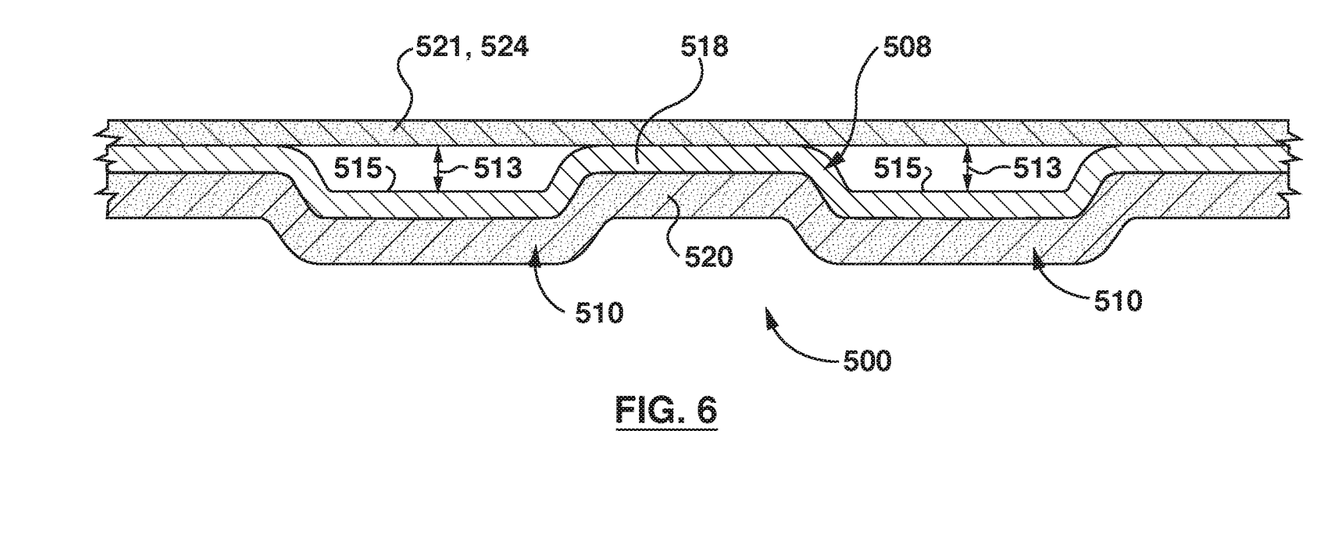
FIG. 6 is a cross-sectional view taken along line 6-6 in FIG. 5.
Figure 6B:
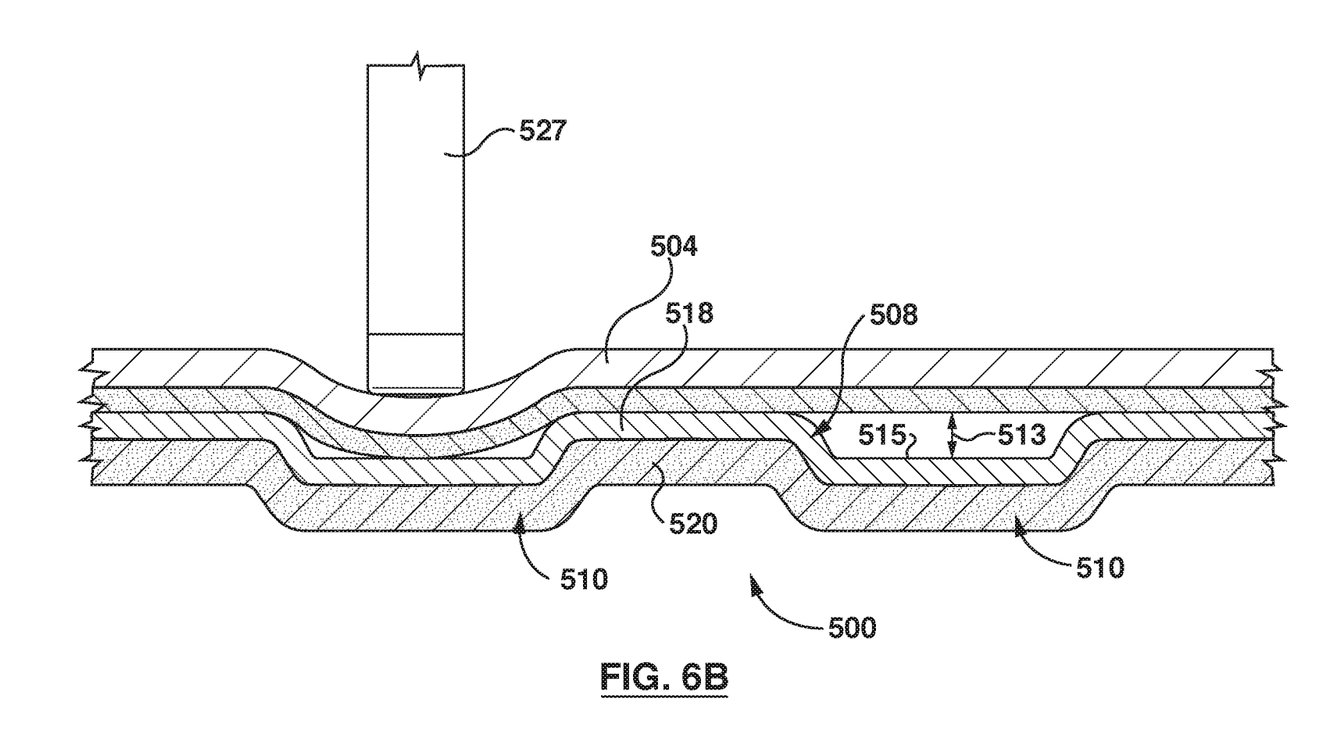
FIG. 6B is a cross-sectional view similar to that of FIG. 6, but also showing a finished flooring product installed on the underlayment, and a high-heeled shoe in use on the finished flooring product.

Referring now to FIGS. 5 to 6B, an alternative example underlayment 500 is shown. In FIGS. 5 to 6, like features as in FIGS. 1 to 4 are referred to with like numerals, incremented by 400.

In the example shown, the underlayment 500 includes a dimpled substrate 508 that is of a similar structure to the dimpled substrate 108, and includes a first layer 518 that is structural plastic layer and a second layer 520 that is a foam layer. However the dimples 510 have an interior height 513 that is less than the interior height 113. In the example shown, the interior height 513 is between about 1 mm and about 5 mm. More specifically, the interior height 513 is about 2 mm.

Furthermore, in the underlayment 500, the smoothing layer 521 comprises a foam sheet 524. The foam sheet 524 may be, for example, a cross-linked high density polyethylene foam, a polyurethane foam, or a cross-linked polypropylene foam. In some particular examples, the foam sheet 524 may be antimicrobial, in order to protect the finished flooring product from mould and/or other microbial growth. The foam sheet 524 may additionally serve to provide sound insulation and thermal insulation. The foam sheet 524 may in some examples be of the same material as the second layer 520.

Referring to FIG. 6B, in some examples, the foam sheet 524 may be generally flexible, stretchy, and non-puncture resistant. In use, if pressure is applied to the foam sheet 524, for example if a flooring product 504 such as carpet overlaying the underlayment 500 is walked on with a high heel shoe 527, the foam sheet 524 will stretch and be depressed into the dimples 510. As the dimples 510 have a relatively small interior height 513, the foam sheet 524 will contact the base surface 515 to prevent any further depression and to prevent puncturing of the foam sheet 524.

In some examples, the underlayment 500 may be rollable into a roll, similar to the underlayment 100.

In some examples, the underlayment 500 may be installed in a manner similar to the manner described above with respect to the underlayment 100.

The examples described above refer to installation of the underlayment 100 in a basement and on a concrete floor. In alternate examples, the underlayment 100 may be installed on other floor types, such as a wooden floor. Furthermore, the underlayment 100 may be installed in other levels of a building, such as a ground floor.

While the above description provides examples of one or more processes or apparatuses, it will be appreciated that other processes or apparatuses may be within the scope of the accompanying claims.

The invention claimed is:

1. An underlayment for a floor comprising:
    a) a dimpled substrate comprising a generally planar top side directed, in use, toward a finished flooring product installable upon the top side, and an opposed bottom side having a plurality of dimples projecting therefrom to bear against a base surface, each dimple bounded by a dimple wall, and comprising a dimple opening along the top side; and
    b) a smoothing layer bonded to the top side of the dimpled substrate and overlaying and occluding the dimple openings,
    wherein the dimpled substrate includes a first layer bonded to the smoothing layer, and a second layer bonded to the first layer, and wherein the first layer is a plastic structural layer, and the second layer is a foam layer.

2. The underlayment of claim 1, wherein the smoothing layer comprises a foam sheet.

3. The underlayment of claim 2, wherein the foam sheet is antimicrobial.

4. The underlayment of claim 2, wherein the foam sheet is one of a cross-linked high density polyethylene foam, a polyurethane foam, or a cross-linked polypropylene foam.

5. The underlayment of claim 1, wherein each dimple wall includes a dimple bottom wall opposite the dimple opening and a dimple sidewall extending between the dimple bottom wall and the top side, the dimple sidewalls maintaining an interior height of the dimples of between about 1 mm and about 5 mm.

6. The underlayment of claim 1, wherein the underlayment is rollable in to a roll.

7. The underlayment of claim 1, wherein the second layer of the dimpled substrate is of the same material as the smoothing layer.

8. An underlayment for a floor comprising:
    a) a dimpled substrate comprising a generally planar top side directed, in use, toward a finished flooring product installable upon the top side, and an opposed bottom side having a plurality of dimples projecting therefrom to bear against a base surface, each dimple bounded by a dimple wall, and comprising a dimple opening along the top side; and
    b) a smoothing layer bonded to the top side of the dimpled substrate and overlaying and occluding the dimple openings,
    wherein each dimple wall includes a dimple bottom wall opposite the dimple opening and a dimple sidewall extending between the dimple bottom wall and the top side, the dimple sidewalls maintaining an interior height of the dimples of between about 1 mm and about 5 mm, and wherein the smoothing layer is depressible into the dimples to contact an interior surface of the dimple bottom wall.

9. A roll of flooring underlayment comprising:
   a) a dimpled substrate comprising a structural plastic layer bonded to a foam layer, the dimpled substrate having a top side formed by the plastic layer, an opposed bottom side formed by the foam layer, and a plurality of dimples formed therein, each dimple bounded by a dimple wall, and comprising a dimple opening along the top side; and
   b) a smoothing layer bonded to the top side of the dimpled substrate and overlaying the dimple openings.

10. The roll of flooring underlayment of claim 9, wherein the smoothing layer occludes the dimple openings.

11. The roll of flooring underlayment of claim 9, wherein the smoothing layer comprises a foam sheet.

12. The roll of flooring underlayment of claim 11, wherein the foam sheet is antimicrobial.

13. The roll of flooring underlayment of claim 9, wherein each dimple wall includes a dimple bottom wall opposite the dimple opening, and each dimple has an interior height between the top side and an interior surface of the dimple bottom wall, and the interior height is between about 1 mm and about 5 mm.

14. The roll of flooring underlayment of claim 13, wherein the smoothing layer is depressible into the dimples to contact the interior surface of the dimple bottom wall.

15. The roll of flooring underlayment of claim 9, wherein the smoothing layer is of the same material as the foam layer.

16. A method of installing a floor on a base surface, the method comprising:
   a) unrolling a roll of flooring underlayment, the flooring underlayment comprising a dimpled substrate having a top side and a bottom side, and a smoothing layer bonded to the top side of the dimpled substrate, wherein the dimpled substrate is of a two-layer construction including a structural plastic layer and a foam layer contiguously bonded to one another over respective facing surfaces, and the bottom side of the dimpled substrate includes dimples projecting away from the top side, each dimple comprising a sidewall and a bottom wall of said two-layer construction with the foam layer facing outward of the dimple;
   b) applying the dimpled substrate of the flooring underlayment to the base surface such that the foam layer of the bottom wall of each dimple bears against the base surface; and
   c) applying a finished floor product directly to the smoothing layer.

17. The method of claim 16, wherein step c) comprises applying at least one of a laminate flooring product, a vinyl flooring product, and a carpet product to the smoothing layer.

* * * * *